（12）United States Patent
Kim et al.

(10) Patent No.: US 12,074,834 B2
(45) Date of Patent: Aug. 27, 2024

(54) METHOD AND SYSTEM FOR EMBEDDING CONTENT IN EDITING AREA

(71) Applicant: SAMSUNG SDS CO., LTD., Seoul (KR)

(72) Inventors: Seung Hwan Kim, Seoul (KR); Jong Ju Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 18/204,022

(22) Filed: May 31, 2023

(65) Prior Publication Data

US 2023/0388258 A1 Nov. 30, 2023

(30) Foreign Application Priority Data

May 31, 2022 (KR) .................. 10-2022-0066549

(51) Int. Cl.
*H04L 51/08* (2022.01)
*G06Q 10/107* (2023.01)
*H04L 51/063* (2022.01)

(52) U.S. Cl.
CPC ........... *H04L 51/08* (2013.01); *G06Q 10/107* (2013.01); *H04L 51/063* (2013.01)

(58) Field of Classification Search
CPC ...... H04L 51/08; H04L 51/063; G06Q 10/107
See application file for complete search history.

(56) References Cited

U.S. PATENT DOCUMENTS

| | | | |
|---|---|---|---|
| 2002/0143885 A1* | 10/2002 | Ross, Jr. | ................. H04L 51/00 713/168 |
| 2017/0132365 A1* | 5/2017 | Nuggehalli | ............ G16H 30/20 |
| 2018/0006983 A1 | 1/2018 | Steplyk et al. | |
| 2019/0182227 A1* | 6/2019 | Rutherford-Jenkins | ..................... H04L 51/42 |
| 2020/0382568 A1* | 12/2020 | Krochmal | ............. G06Q 50/01 |
| 2021/0173493 A1* | 6/2021 | Barzilay | ............... G06F 3/0482 |
| 2023/0283580 A1* | 9/2023 | Rodriguez | ............. G06Q 50/01 709/206 |
| 2023/0353587 A1* | 11/2023 | Bui | ..................... G06F 16/9024 |

FOREIGN PATENT DOCUMENTS

| | | | | |
|---|---|---|---|---|
| CN | 110417639 A | | 11/2019 | |
| ES | 2382392 T3 | * | 6/2012 | ........ H04M 1/72552 |
| JP | 6495511 B1 | | 4/2019 | |

(Continued)

*Primary Examiner* — Richard G Keehn
(74) *Attorney, Agent, or Firm* — Sughrue Mion, PLLC

(57) ABSTRACT

A method for solving a problem and a system thereof are provided. The method includes displaying, by a first terminal device, an embedding content search interface, which is included in a content authoring user interface for creating target content to be transmitted, displaying, by the first terminal device, an indicator of embedding content, determined by user input via the embedding content search interface, in an editing area in the content authoring user interface, transmitting, by the first terminal device, a body of the target content and metadata of the embedding content in response to receipt of input for a "Send" button in the content authoring user interface, and displaying, by a second terminal device, received content with the embedding content embedded therein, wherein the embedding content is embedded in the body of the target content by a server system.

14 Claims, 12 Drawing Sheets

(56) References Cited

FOREIGN PATENT DOCUMENTS

| | | |
|---|---|---|
| KR | 10-2007-0096286 A | 10/2007 |
| KR | 10-2013-0026215 A | 3/2013 |
| KR | 10-2015-0077591 A | 7/2015 |
| WO | WO-2016189350 A1 * | 12/2016 ............ H04L 51/04 |
| WO | WO-2022162414 A1 * | 8/2022 |

* cited by examiner

METHOD AND SYSTEM FOR EMBEDDING CONTENT IN EDITING AREA

CROSS-REFERENCE TO RELATED APPLICATION

This application claims priority from Korean Patent Application No. 10-2022-0066549 filed on May 31, 2022 in the Korean Intellectual Property Office, and all the benefits accruing therefrom under 35 U.S.C. 119, the contents of which in its entirety are herein incorporated by reference.

BACKGROUND

1. Field

The present disclosure relates to a method and system for embedding content in an editing area, and more particularly, a method and system for transmitting only metadata of embedding content and receiving the original data of metadata.

2. Description of the Related Art

There are cases in which content (e.g., the main text or attachment(s) of email or a payment document) need to be transmitted between users via electronic devices.

Conventionally, the body of content is either copied to a clipboard or downloaded in a local computer and is then added to an editing area to be transmitted.

However, the copying or downloading of content to transmit the content is inconvenient because it involves several steps that users need to go through and often involves switching between multiple windows.

Also, as content becomes vulnerable to manipulation while being transmitted, the reliability of content cannot be guaranteed, and content may be undesirably modified in the process of being stored, for example, in a memory or as a file.

Also, the storing of content in a local computer may weaken the security of the content in terms of leaving unnecessary data in an external device.

SUMMARY

Aspects of the present disclosure provide a system capable of making the process of creating target content to be transmitted efficient for a user by omitting the step of either moving to content to be added and copying the content to be added to a clipboard or downloading the content to be added in a first terminal device to add the content to be added to the target content.

Aspects of the present disclosure also provide a system capable of ensuring the reliability of content by preventing modifications from being accidentally or intentionally made to content, for example, in the process of storing content in a memory or as a file.

Aspects of the present disclosure provide a system capable of ensuring the security of content by providing only metadata to a first terminal device and storing the original content only in a server.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a method of transmitting content, performed by a computing system. The method comprises displaying, by a first terminal device, an embedding content search interface, which is included in a content authoring user interface for creating target content to be transmitted, displaying, by the first terminal device, an indicator of embedding content, determined by user input via the embedding content search interface, in an editing area in the content authoring user interface, transmitting, by the first terminal device, a body of the target content and metadata of the embedding content in response to receipt of input for a "Send" button in the content authoring user interface, and displaying, by a second terminal device, received content with the embedding content embedded therein, wherein the embedding content is embedded in the body of the target content by a server system.

In some embodiments, the displaying the embedding content search interface, may comprise displaying an "Attach" button in the editing area and displaying the embedding content search interface in response to the "Attach" button being selected.

In some embodiments, the displaying the "Attach" button, may comprise displaying the "Attach" button, only when no content is input to a line where a cursor of the editing area is located.

In some embodiments, the embedding content search interface may include a content category choice area and a checkbox for whether to display the indicator of the embedding content in the body of the target content.

In some embodiments, the content category choice area may include a plurality of content category choices to choose from, the indicator of the embedding content has a first appearance if the embedding content belongs to a first content category and has a second appearance if the embedding content belongs to a second content category, and the second content category is different from the first content category.

In some embodiments, the displaying the indicator of the embedding content in the editing area, may comprise receiving metadata of the embedding content from the server system and displaying the indicator with the received metadata applied thereto in the editing area.

In some embodiments, may automatically move a cursor of the editing area below the indicator of the embedding content, after the displaying the indicator of the embedding content in the editing area.

In some embodiments, the indicator of the embedding content may be a graphic element that cannot be edited.

In some embodiments, the transmitting the body of the target content and the metadata of the embedding content, may comprise transmitting the body of the target content and only the metadata of the embedding content.

In some embodiments, the displaying the indicator of the embedding content in the editing area, may comprise downloading only the metadata of the embedding content.

According to the aforementioned and other embodiments of the present disclosure, there is provided a method of transmitting content, performed by a computing system. The method comprises displaying, by a first terminal device, an embedding content search interface, which is included in a content authoring user interface for creating target content to be transmitted and is for receiving a selection for embedding content to be attached to the target content, transmitting, by the first terminal device, a body of the target content and metadata of the embedding content in response to receipt of input for a "Send" button in the content authoring user interface, and displaying, by a second terminal device, received content with the embedding content attached thereto, wherein the embedding content is attached by a server system to the target content.

In some embodiments, the first terminal device may display an indicator of the embedding content, determined in accordance with user input via the embedding content search interface, in an editing area, which is included in the content authoring user interface.

In some embodiments, the displaying the embedding content search interface, may comprise downloading only the metadata of the embedding content in response to the embedding content being selected via the embedding content search interface.

According to yet another aspect of the present disclosure, there is provided a method of transmitting content, performed by a computing system. The method comprises displaying, by a first terminal device, an embedding content search interface, which is included in a content authoring user interface for creating target content to be transmitted, displaying, by the first terminal device, an attached file of attachment-containing content, determined by user input via the embedding content search interface, as an attachment candidate, storing information on the attachment candidate as information on an attachment of the target content in response to receipt of a selection for the attachment candidate from a user of the first terminal device, and displaying, by a second terminal device, received content with an attached file, wherein the attachment of the target content is attached by a server system to the target content.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. In addition, in describing the present disclosure, when it is determined that the detailed description of the related well-known configuration or function may obscure the gist of the present disclosure, the detailed description thereof will be omitted.

A method of transmitting content according to some embodiments of the present disclosure will hereinafter be described with reference to FIG. 1. The method may be performed by at least one computing system. Although not specifically mentioned, steps or operations of the method should be understood as being performed by the computing system, and the computing system will hereinafter be referred to as a content embedding system.

Figure 1:
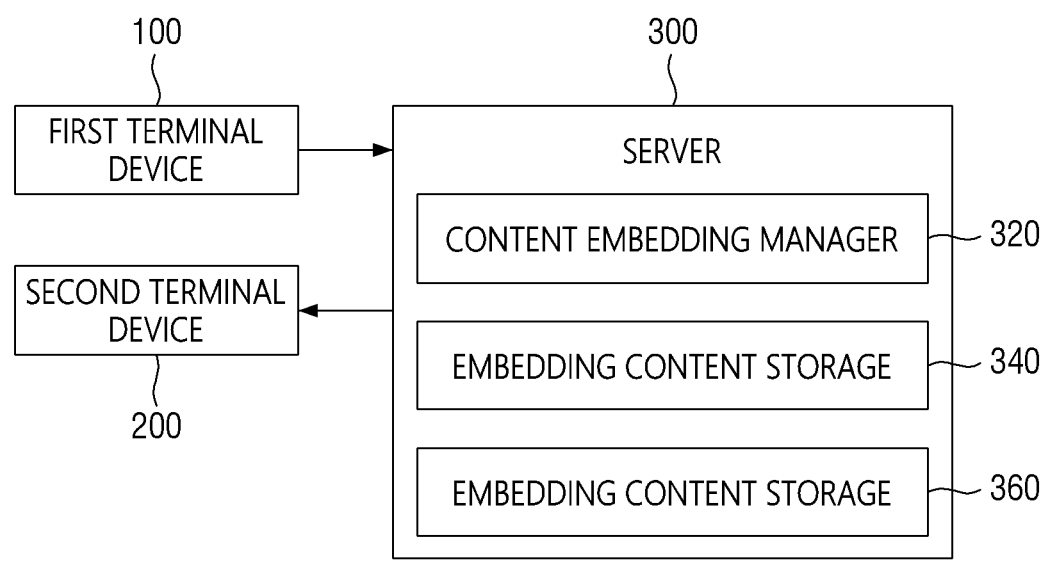
FIG. 1 is a block diagram of a content embedding system according to an embodiment of the present disclosure.

FIG. 1 is a block diagram of a content embedding system according to an embodiment of the present disclosure. Referring to FIG. 1, the content embedding system may include a first terminal device 100, a second terminal device 200, and a server 300.

The first terminal device 100 may be the terminal of the sender of email, and the second terminal device 200 may be the terminal of the receiver of the email transmitted via the first terminal device 100.

Content requested by the first terminal device 100 to be transmitted may be transmitted to the server 300, content requested by the second terminal device 200 to be displayed may be transmitted from the server 300 to the second terminal device 200, and content received by the second terminal device 200 may be displayed in the second terminal device 200.

The server 300, which receives content from the first terminal device 100 and transmits content to the second terminal device 200, may include a content embedding manager 320, an embedding content storage 340, and a content transmitter 360.

The content embedding manager 320 and the embedding content storage 340 may exchange signals and data with each other.

The embedding content storage 340 may include original embedding content and metadata of the embedding content. The embedding content may be existing content that is not authored by the user of the first terminal device, among content to be transmitted by the user of the first terminal device 100.

The content embedding manager 320 may transmit a signal for storing original embedding content for which a selection has been received to the embedding content storage 340. Then, the embedding content storage 340 may transmit metadata of the original embedding content to the content embedding manager 320.

The content embedding manager 320 of the server 300 and the first terminal device 100 may exchange signals and data with each other.

When the user of the first terminal device 100 enters a request for a content search, the first terminal device 100 may transmit an embedding content search signal to the content embedding manager 320. Then, the content embedding manager 320 may transmit content choice data to the first terminal device 100. Then, the first terminal device 100 may receive a selection for particular content, among the content choice data, from the user of the first terminal device 100 and may transmit a content selection signal to the content embedding manager 320.

Then, the content embedding manager 320 may transmit metadata of embedding content corresponding to the selection received from the user of the first terminal device 100 to the first terminal device 100. Upon receipt of the metadata of the embedding content, the first terminal device 100 may receive a request for the transmission of content including metadata from the user of the first terminal device 100 and may transmit a content transmission signal to the content embedding manager 320.

The content embedding manager 320 may receive a display request signal from the second terminal device 200. Then, the content embedding manager 320 may transmit a transmission signal for received content with embedding content embedded therein to the content transmitter 360. Then, the content transmitter 360 may transmit the received content with the embedding content embedded therein to the second terminal device 200.

In some embodiments, content that the user of the first terminal device 100 requests to be transmitted by the first terminal device 100 may be an email, a social networking service (SNS) message, or the like, and embedding content that can be embedded in such content may be an existing email received by the user of the first terminal device 100, a file to be attached, an attached file of the existing email, an SNS post written by another user, a news article, a payment document, webpage summary information, or the like. However, the present disclosure is not limited to this.

Figure 2:
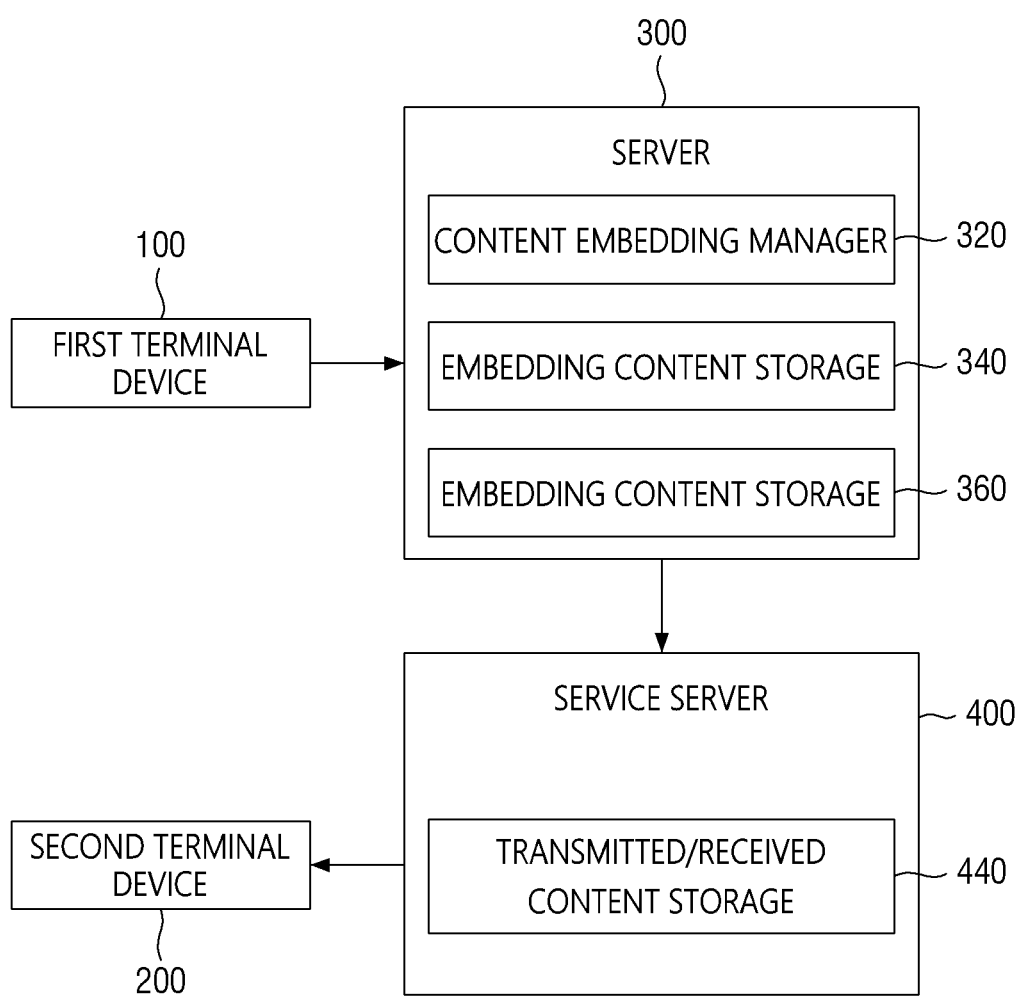
FIG. 2 is a block diagram of a content embedding system according to another embodiment of the present disclosure.

FIG. 2 is a block diagram of a content embedding system according to another embodiment of the present disclosure. Referring to FIG. 2, the content embedding system may include a first terminal device 100, a second terminal device 200, a server 300, and a service server 400, which is separate from the server 300.

The service server 400 may be a server storing target content to be transmitted, transmitted by the user of the first terminal device 100 without designating the receiver of the corresponding content.

The first terminal device 100 may be the terminal of a user who posts content, and the second terminal device 200 may be the terminal of a user who views the content posted via the first terminal device 100.

The target content, transmitted by the user of the first terminal device 100 to the service server 400, may be stored in a transmitted/received content storage 440, and received content, which is obtained by embedding embedding content in the target content, may also be stored in the transmitted/received content storage 440.

The service server 400 may receive a display request signal from the second terminal device 200. Then, the service server 400 may transmit content corresponding to the display request signal, among the content stored in the transmitted/received content storage 440, to the second terminal device 200.

In the content embedding system of FIG. 2 where the server 300 and the service server 400 are separate, the first terminal device 100 may transmit the target content without designating the second terminal device 200 as the receiver of the target content, and the user of the second terminal device 200 may actively search for and receive the target content as received content. The received content may be content obtained by embedding embedding content in the target content transmitted by the user of the first terminal device 100.

Figure 3:
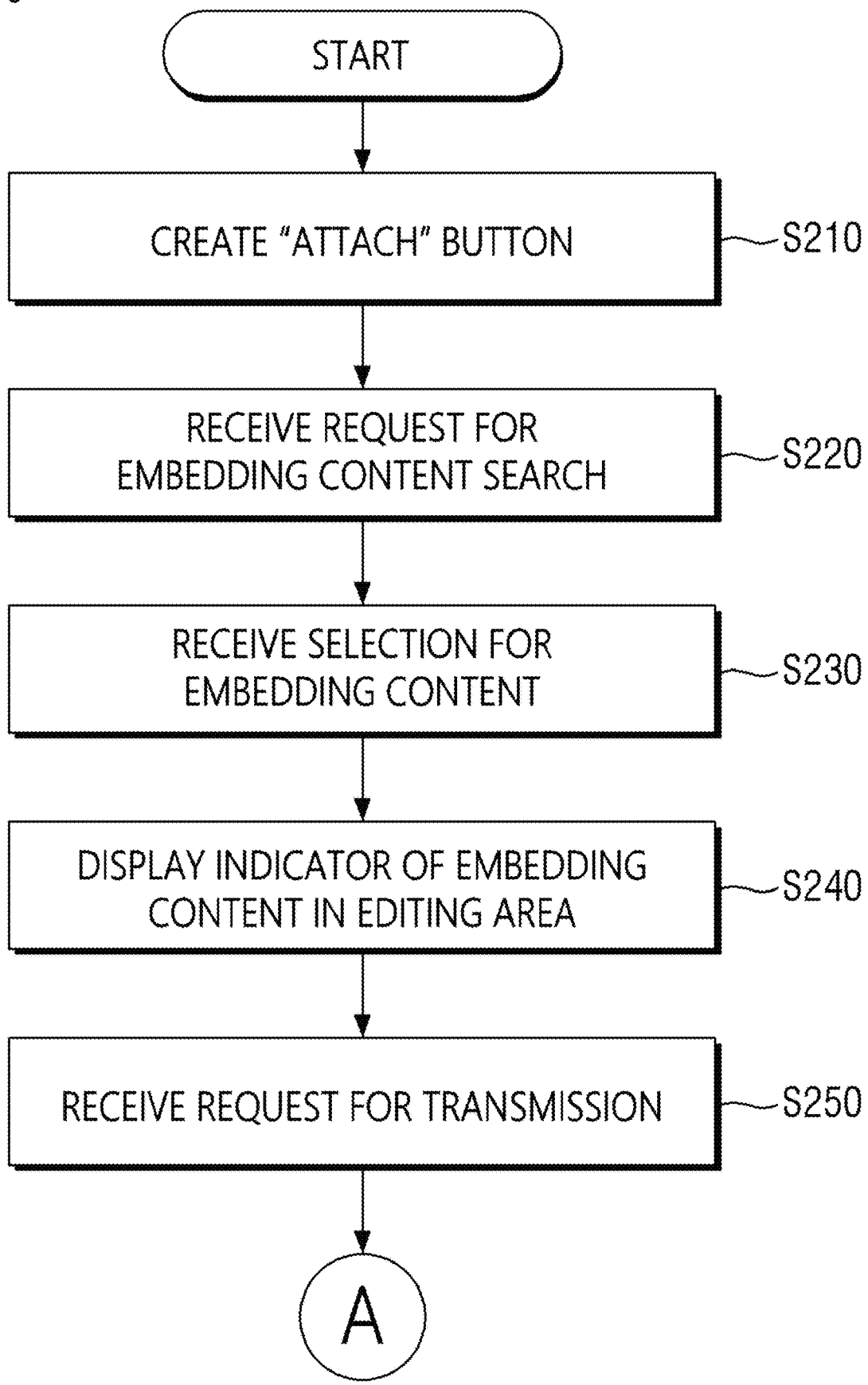
FIG. 3 is a flowchart illustrating how to transmit content in a first terminal device, according to some embodiments of the present disclosure.

It will hereinafter be described how to transmit content with reference to FIG. 3. FIG. 3 is a flowchart illustrating how to transmit content in a first terminal device, according to some embodiments of the present disclosure. However, the embodiment of FIG. 3 is merely exemplary, and obviously, some steps may be added to, or deleted from, the embodiment of FIG. 3.

Referring to FIG. 3, a first terminal device 100 may create an "Attach" button (S210) and may receive a request for an embedding content search from the user of the first terminal device 100 (S220). Then, if a selection for embedding content is received from the user of the first terminal device 100 (S230), the first terminal device 100 displays an indicator including metadata of embedding content corresponding to the received selection in an editing area (S240), and may receive a request for the transmission of content from the user of the first terminal device 100 (S250).

The indicator is a graphic element for visual recognition of where in target content to be transmitted embedding content is to be arranged.

The appearance of the indicator may vary depending on the category of embedding content that the indicator is to replace. If the embedding content belongs to a first category, the indicator may have a first appearance, and if the embedding content belongs to a second category, the indicator may have a second appearance.

The indicator is a graphic element indicating the location of the embedding content in the target content. Specifically, the indicator is a graphic element that is displayed in the target content with a predefined appearance in response to receipt of a selection for the embedding and cannot be edited.

The embodiment of FIG. 3 will hereinafter be described with reference to FIGS. 4 through 9.

Figure 4:
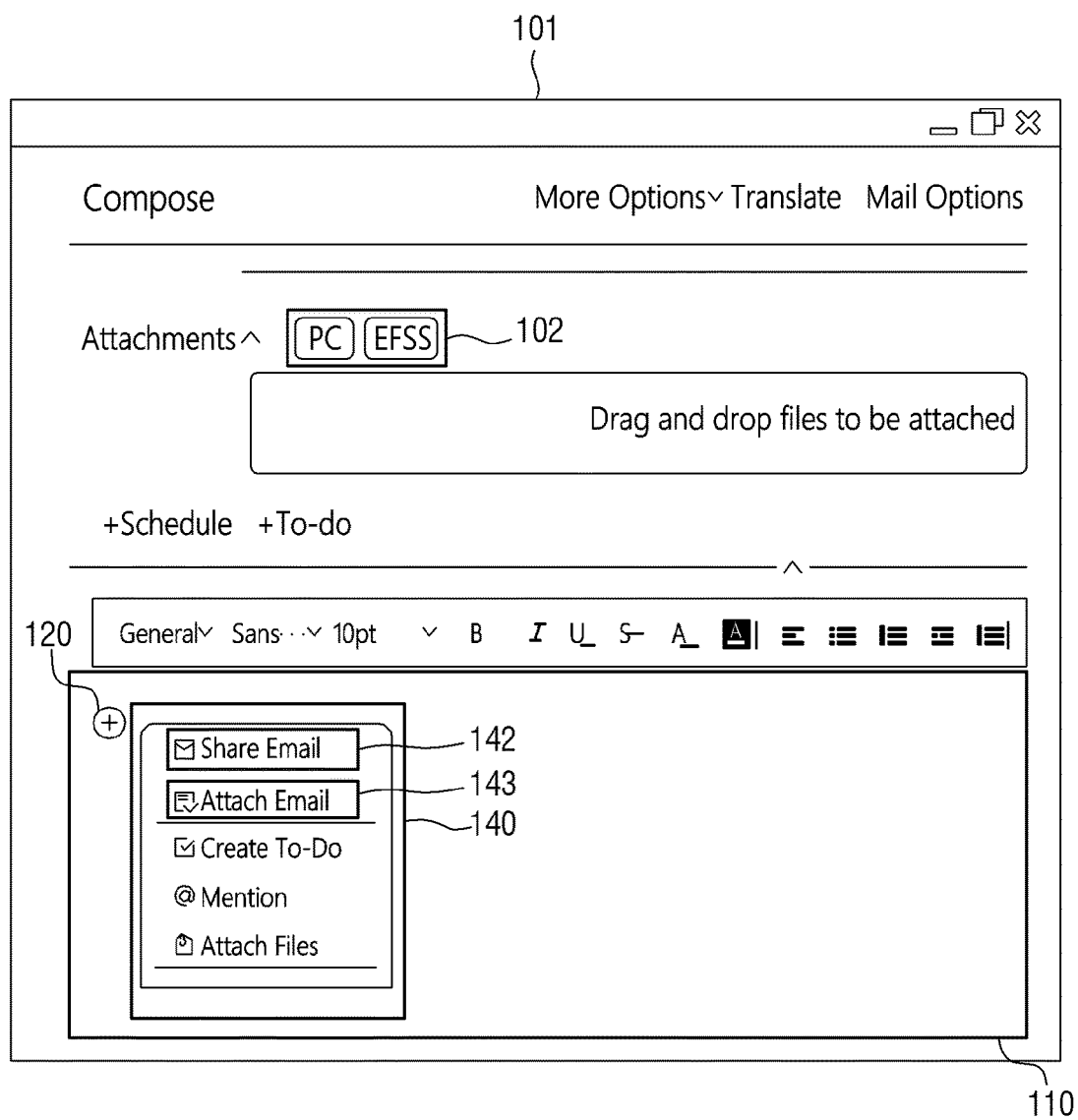
FIGS. 4 through 9 illustrate how to transmit content according to some embodiments of the present disclosure.

FIG. 4 illustrates an exemplary screen of the first terminal device 100 creating an "Attach" button 120 (S210) and receiving a request for an embedding content search for embedding content from the user of the first terminal device 100 (S220).

Referring to FIG. 4, the "Attach" button 120 may be displayed in an editing area 110, which is displayed in a content authoring user interface 10. When the "Attach" button 120 is activated, a target content choice area 140 may be displayed in the content authoring user interface 10.

The "Attach" button 120 may be displayed where the cursor of the editing area 110 is located, when no content is input to a line corresponding to the location of the cursor of the editing area 110.

The "Attach" button 120 may be activated by scrolling a mouse cursor in a predefined region near the "Attach" button 120, touching on the "Attach" button 120, clicking on the "Attach" button 120, or not generating any particular input for a predefined amount of time with only the "Attach" button 120 displayed in the editing area 110.

Figure 5:
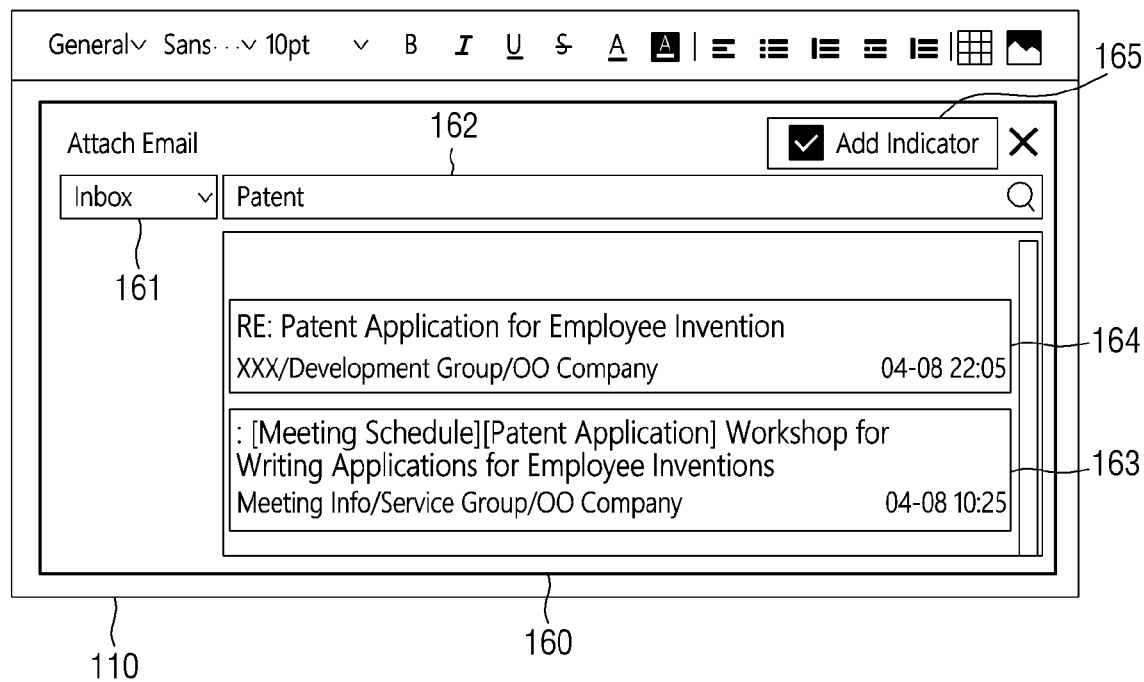

FIG. 5 illustrates an exemplary screen of the first terminal device 100 operating in response to receipt of a selection for a "Share Email" option 142 or an ""Attach Email" option 143 in the target content choice area 140.

Referring to FIG. 5, in response to the "Attach" button 120 being selected, an embedding content search interface 160 may be displayed in the editing area 110. The selection of the "Attach" button 120 may mean the selection of an option provided in the target content choice area 140.

In the embedding content search interface 160, a content category choice area 161, an embedding content search window 162, embedding content candidates 163 and 164, and a checkbox 165 for whether to display the indicator of embedding content may be displayed.

The checkbox 165 may be displayed to receive a selection for whether to additionally display an indicator in target content to be transmitted, when the target content includes an attached file.

The content category choice area 161 may include content category choices for the user of the first terminal device 100 to choose from.

Specifically, in response to a selection for the "Share Email" option 142 or the "Attach Email" option 143 being input, the embedding content search interface 160, which includes the content category choice area 161 and the embedding content search window 162, may be displayed.

In the embedding content search interface 160, content including a search term (or word) input to the embedding content search window 162, from among content belonging to a content category selected from the content category choice area 161, may be displayed.

Specifically, emails 163 and 164 including the input search term (or word), from a list of emails previously received by the user of the first terminal device 100, may be displayed.

Metadata of embedding content to be attached to the target content may be input to the embedding content search window 162. The metadata of the embedding content may be identification information for searching for and embedding the embedding content. The metadata of the embedding content may include the dates when the embedding content was sent, received, and created, the creator of the embedding content, words included in the title of the embedding content, the uniform resource locator (URL) of an attached file of the embedding content, the identifier (ID) of email, and file path information.

In response to receipt of a selection for the display of the indicator of the embedding content in the embedding content search interface 160 via the checkbox 165, the indicator of the embedding content may be displayed in the target content.

Figure 6:
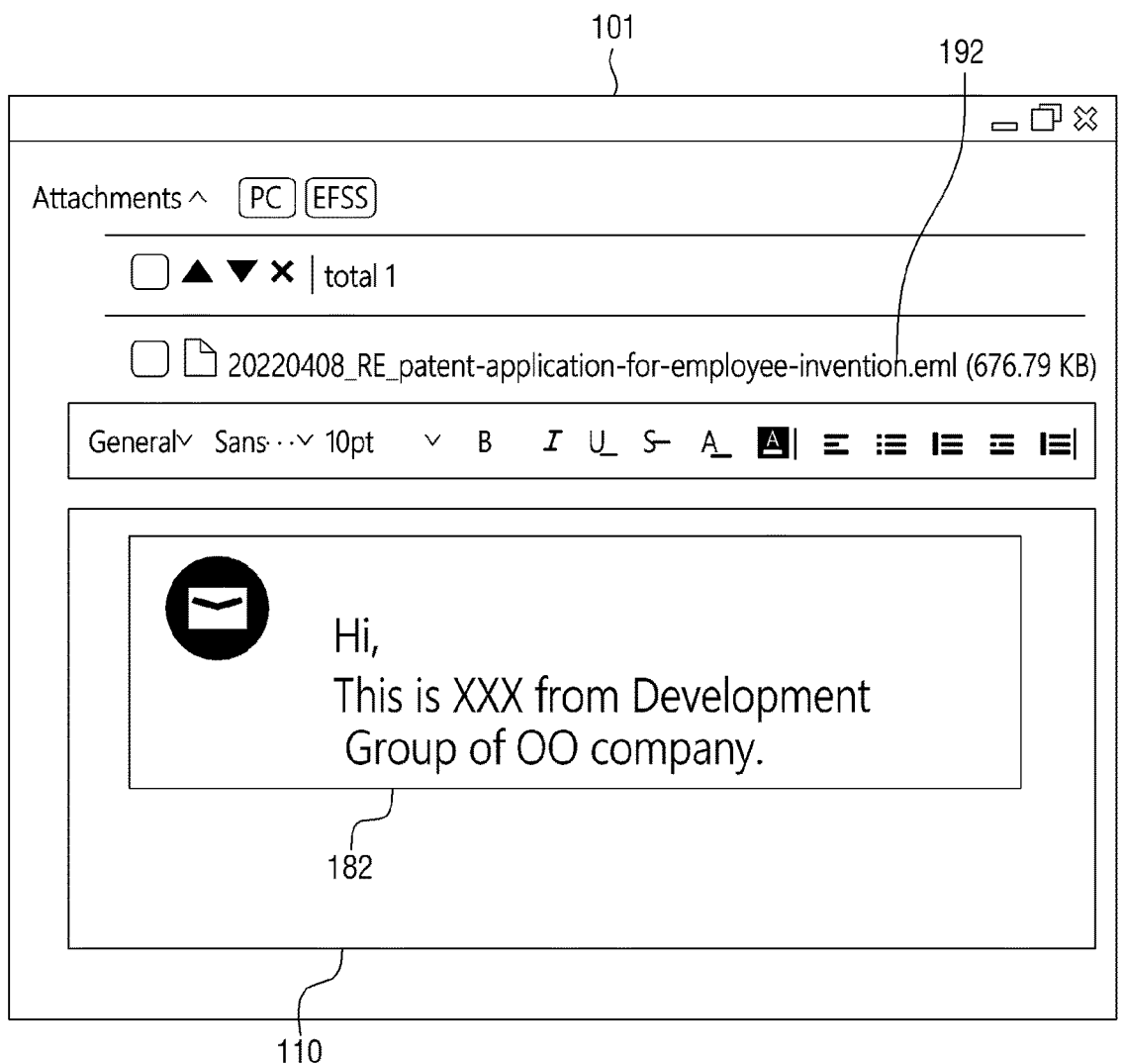

FIG. 6 illustrates an exemplary screen of the first terminal device 100 operating in response to receipt of a selection for the email 164 (S230).

For example, referring to FIG. 6, in response to receipt of a selection for the "Share Email" option 142, an indicator 182, which includes metadata of embedding content selected (S230) by the user of the first terminal device 100, may be displayed in the editing area 110 (S240).

For example, referring to FIG. 6, in response to receipt of a selection for the "Attach Email" option 143, the selected embedding content may be automatically generated as an attached file 192 and may then be attached to the target content.

In response to receipt of a selection for embedding content for the target content (S230) and a selection for the checkbox 165 being further received, the indicator 182, which includes metadata of the embedding content, may be displayed in the editing area 110 (S240).

Once the indicator 182 is displayed in the editing area 110, the cursor of the editing area 110 may automatically move to a line below the indicator 182.

The indicator 182, which includes the attached file 192 and the metadata of the embedding data, may be identifiable, only as metadata, in the first terminal device 100.

The attached file 192 is replaced with an original attachment when received by the second terminal device 200 from the server 300. A link to the original embedding content may be embedded in the indicator 182, which includes the metadata of the corresponding embedding content, when received by the second terminal device 200 from the server 300.

The original attachment may be a file that does not exist in the first terminal 100, but is directly transmitted from the server 300 to the second terminal device 200.

According to the embodiment of FIGS. 4 through 6, the copying of embedding content to a clipboard or the downloading of the embedding content in the first terminal device 100 to add the embedding content to target content to be transmitted can be omitted.

Accordingly, embedding content can be prevented from being accidentally modified, for example, in the process of storing the content in a memory or as a file.

Also, as embedding content cannot be modified, the reliability of content can be improved.

Also, as the inconvenience of switching between multiple windows can be eliminated via a "Create Attachment Window" button 102, the efficiency of creating target content to be transmitted can be improved.

Other examples of the embodiment of FIG. 3 will hereinafter be described with reference to FIGS. 7 through 9.

Figure 7:
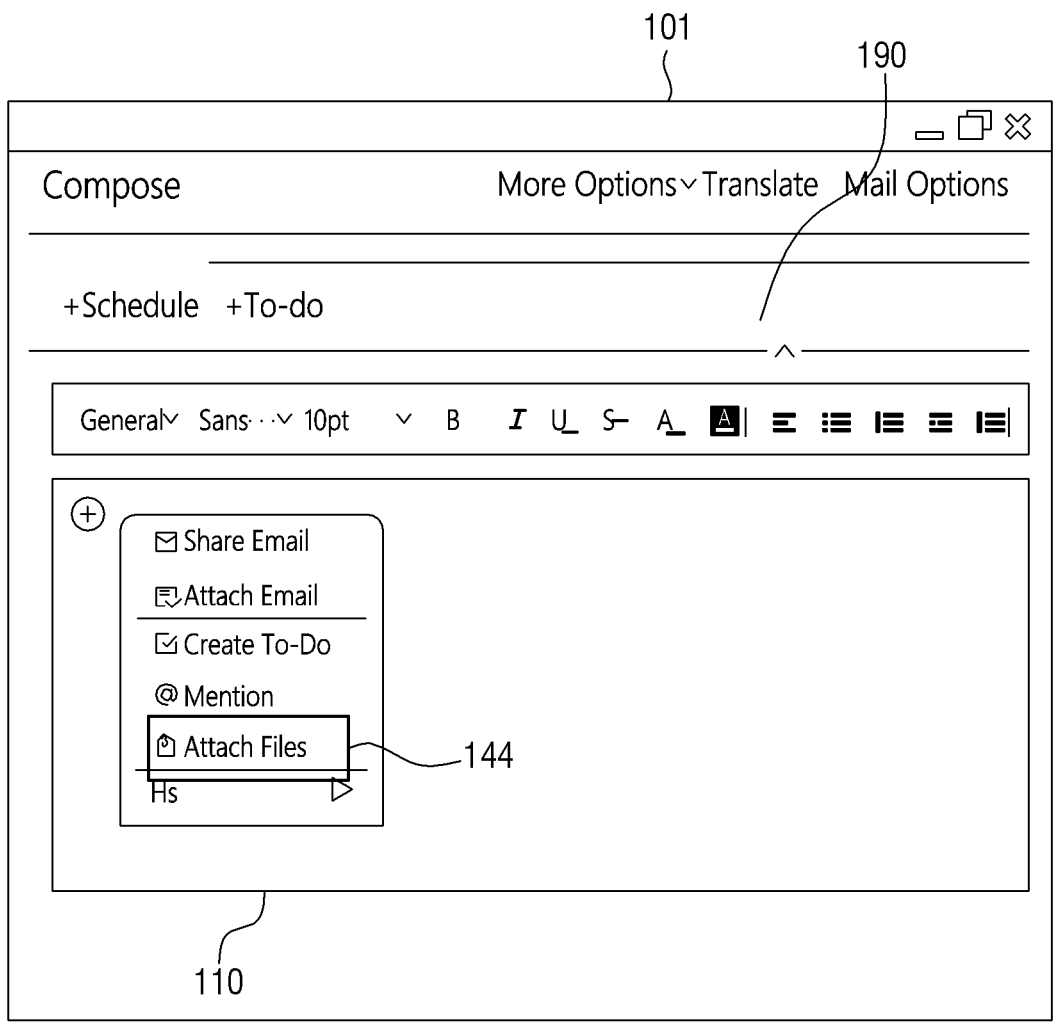

FIG. 7 illustrates an exemplary screen of the first terminal device 100 creating an "Attach" button (S210) and receiving a request for an embedding content search from the user of the first terminal device 100 (S220).

Referring to FIG. 7, an attached file display window 190 may not include a "Create Attachment Window" button 102. When an "Attach" button 120 in an editing area 110 is activated, the user of the first terminal device 100 may attach an attachment to target content to be transmitted, by entering a selection for an "Attach File" option 144 in a target content choice area 140, instead of using the "Create Attachment Window" button 102.

Figure 8:
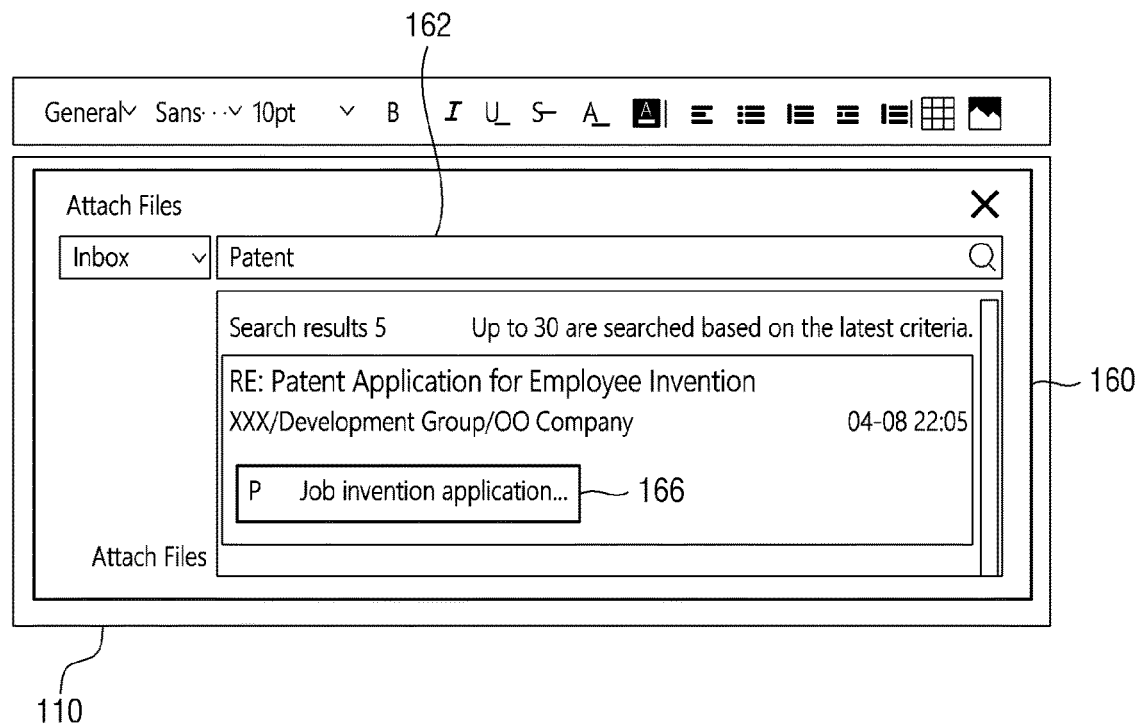

FIG. 8 illustrates an exemplary screen of the first terminal device 100 receiving a selection for embedding content from the user of the first terminal device 100 (S220).

For example, referring to FIG. 8, in response to the "Attach" button 120 being selected, an embedding content search interface 160 may be displayed in the editing area 110. In the embedding content search interface 160, a content category choice area 161, an embedding content search window 162, an attachment candidate 166, and a checkbox 165 for whether to display the indicator of embedding content may be displayed.

The content category choice area 161 may include content category choices for the user of the first terminal device 100 to choose from.

Specifically, in response to a selection for an "Attach File" option 144 being selected, an embedding content search interface 160, which includes the content category choice area 161 and the embedding content search window 162, may be displayed.

In the embedding content search interface 160, content including a search term (or word) input to the embedding content search window 162, from among content belonging to a content category selected from the content category choice area 161, may be displayed.

Specifically, emails including the input search term, from a list of emails previously received by the user of the first terminal device 100, may be displayed. The list of previous emails may include the attachment candidate 166.

The attachment candidate 166 may be an attachment of an email previously received by the user of the first terminal device 100. As more than one attachment can be attached to an email, there may be more than one attachment candidate 166.

Metadata of embedding content may be input to the embedding content search window 162. The metadata of the embedding content may include the dates the embedding content was sent, received, and created, the creator of the embedding content, and words included in the title of the embedding content.

In response to receipt of a selection for the display of the indicator of the embedding content via the checkbox 165, the indicator of the embedding content may be displayed in the body of the target content.

Figure 9:
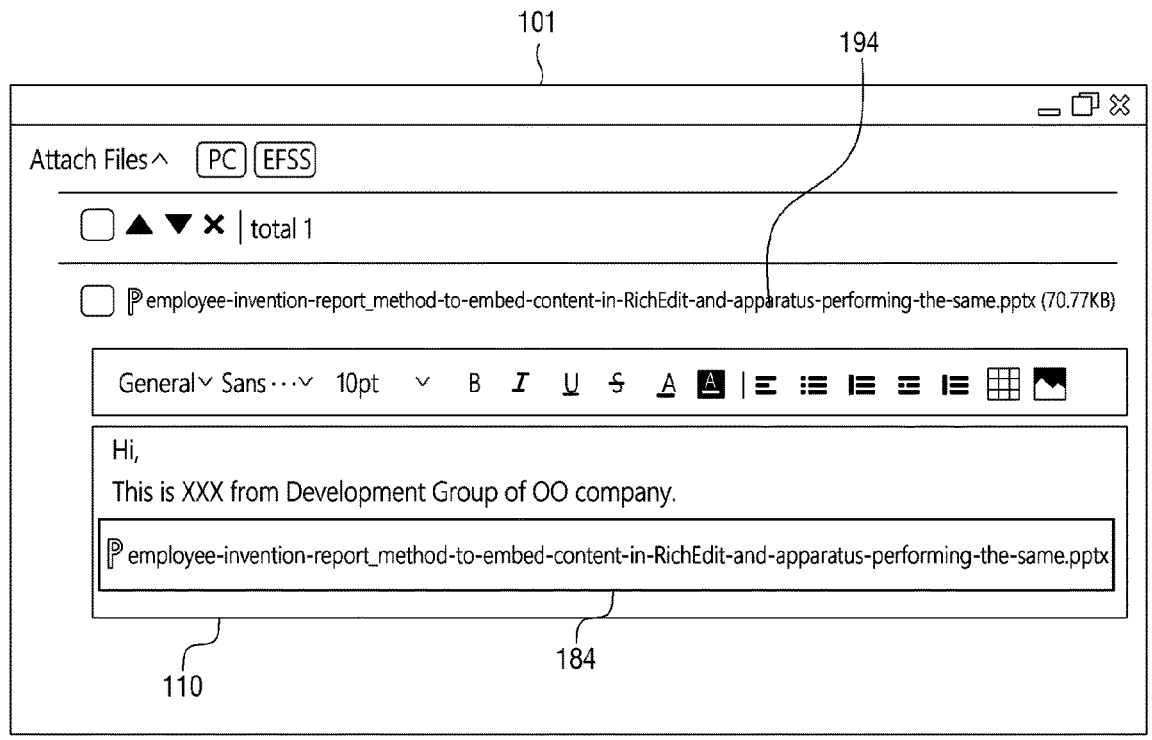

FIG. 9 illustrates an exemplary screen of the first terminal device 100 operating in response to receipt of a selection for the attachment candidate 166 (S230).

For example, referring to FIG. 9, in response to receipt of a selection for the "Attach File" option 144, an attached file 194 for embedding content selected (S230) by the user of the first terminal device 100 may be displayed in the attached file display window 190.

In response to receipt of a selection for embedding content for the target content (S230) and a selection for the checkbox 165 being further received, an indicator 184, which includes metadata of the embedding content, may be displayed in the editing area 110 (S240).

According to the embodiment of FIGS. 7 through 9, the copying of embedding content to a clipboard or the downloading of the embedding content in the first terminal device 100 to add the embedding content to the body of target content to be transmitted can be omitted.

Accordingly, embedding content can be prevented from being accidentally modified, for example, in the process of storing the content in a memory or as a file.

Also, as embedding content cannot be modified, the reliability of content can be improved.

If content that requires security is stored in the first terminal device 100, the security of the content may weaken in terms of leaving unnecessary data in an external device. However, according to the embodiment of FIGS. 7 through 9, as only metadata is present in the first terminal device 100, whereas original content exists only in the server 300, the security of content can be further improved.

However, the embodiment of FIG. 3 is merely exemplary, and obviously, some steps may be added to, or deleted from, the embodiment of FIG. 3, if necessary.

For example, referring again to FIG. 3, a plurality of indicators may be displayed in target content to be content, and if a determination is made that the user of the first terminal device 100 has completed adding indicators and creating content, a send command may be entered for the target content (S250).

Figure 10:
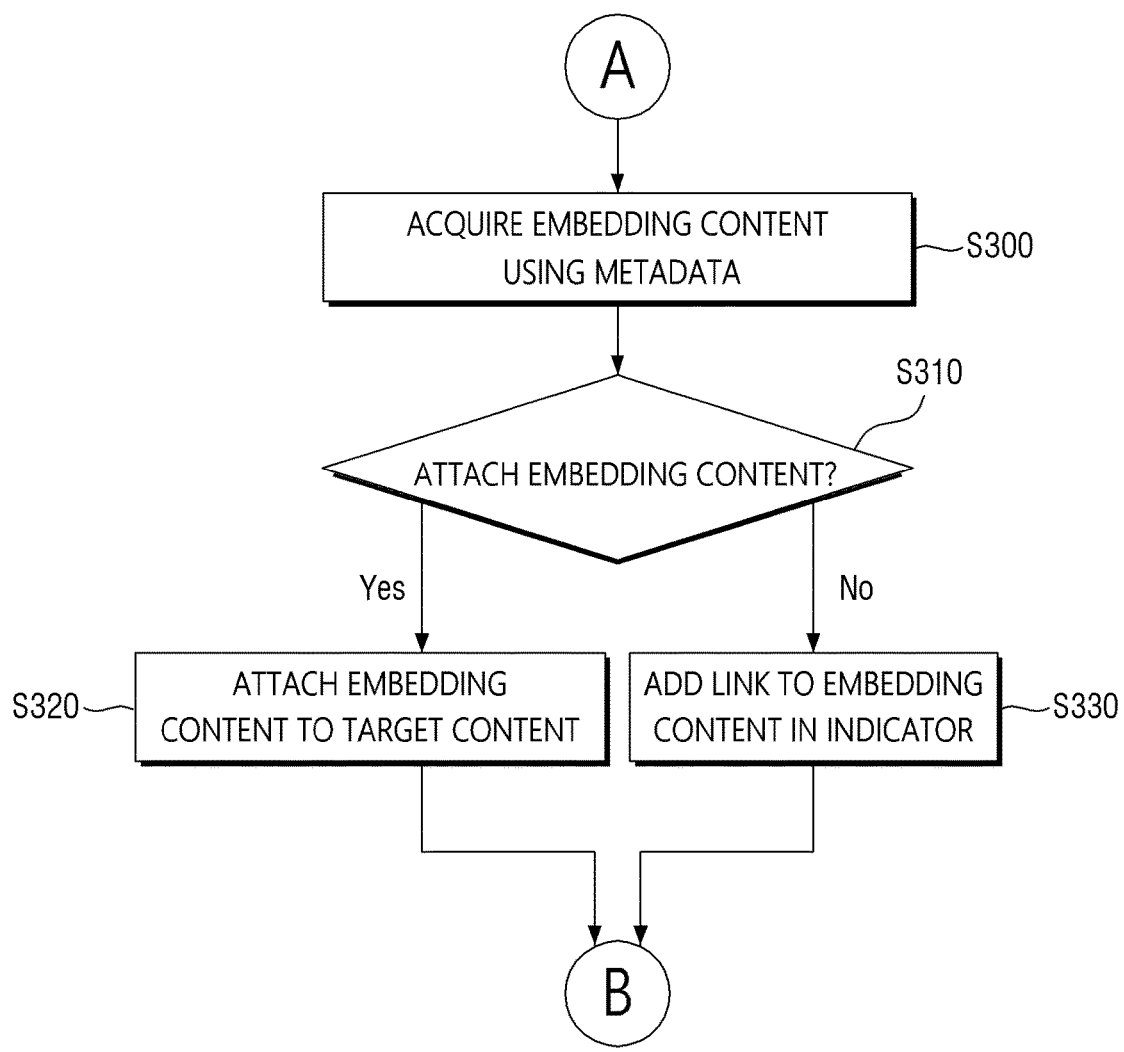
FIG. 10 is a flowchart illustrating a content embedding method of a server according to some embodiments of the present disclosure.

It will hereinafter be described how the first terminal device 100 transmits target content to be transmitted, for which a send command has been entered (S250). FIG. 10 is a flowchart illustrating how to embed content in a server, according to some embodiments of the present disclosure.

Referring to FIG. 10, the server 300 acquires embedding content using metadata and determines whether to attach the embedding content (S310) depending on the type of target content to be transmitted. If a determination is made that the target content needs an attachment, an attached file may be added to the target content (S320), and if a determination is made that the target content does not need an attachment, a link to the embedding content may be added (S330) to an indicator included in the target content.

If the service server 400 is further provided, received content with the embedding content attached thereto or with the link to the embedding content added thereto may be stored in the service server 400.

The target content may be classified depending on whether an attached file thereof is displayed in the attached file display window 190 and an indicator of the target content is displayed in the editing area 110.

If an attachment of the target content is displayed in the attached file display window 190 and the indicator of the target content is displayed in the editing area 110, an attached file may be attached to the target content, and a link to the embedding content may be added to the indicator included in the target content.

Figure 11:
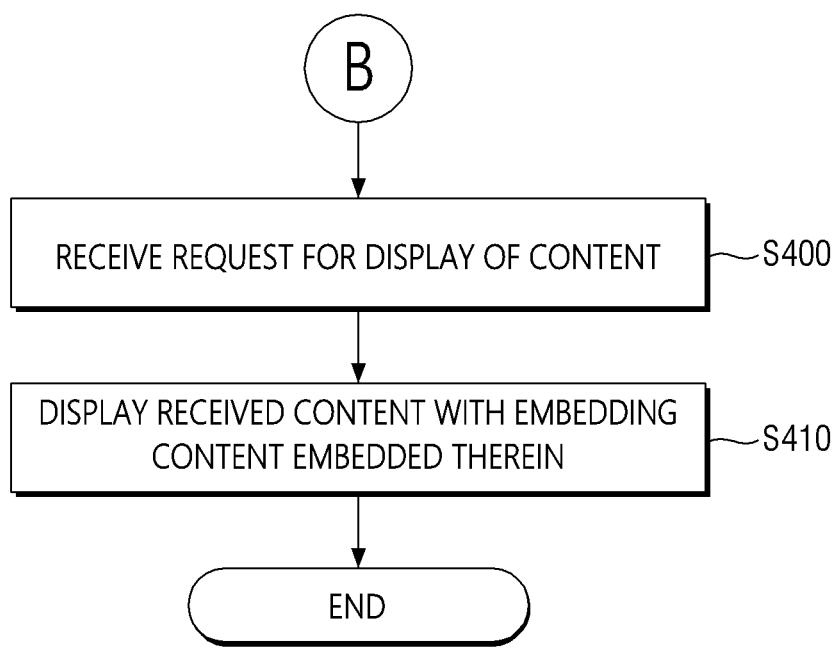
FIG. 11 is a flowchart illustrating how to receive content in a second terminal device, content according to some embodiments of the present disclosure.

It will hereinafter be described how to transmit content from the server 300 to the second terminal device 200. FIG. 11 is a flowchart illustrating how to receive content in the second terminal device 200.

Referring to FIG. 11, the second terminal device 200 may receive a request for the display of content from its user (S400) and may display received content with embedding content embedded therein (S410).

For example, the user of the second terminal device 200 may enter a request for the display of the received content. Also, the user of the second terminal device 200 may enter a request for the display of content disclosed in the service server 400.

For example, the user of the second terminal device 200 may download embedding content attached to the received content in the second terminal device 200. Also, the user of the second terminal device 200 may access the embedding content by activating an indicator displayed in the body of the received content. The user of the second terminal device 200 may generate new target content to be transmitted, with the received content embedded therein as embedding content.

Figure 12:
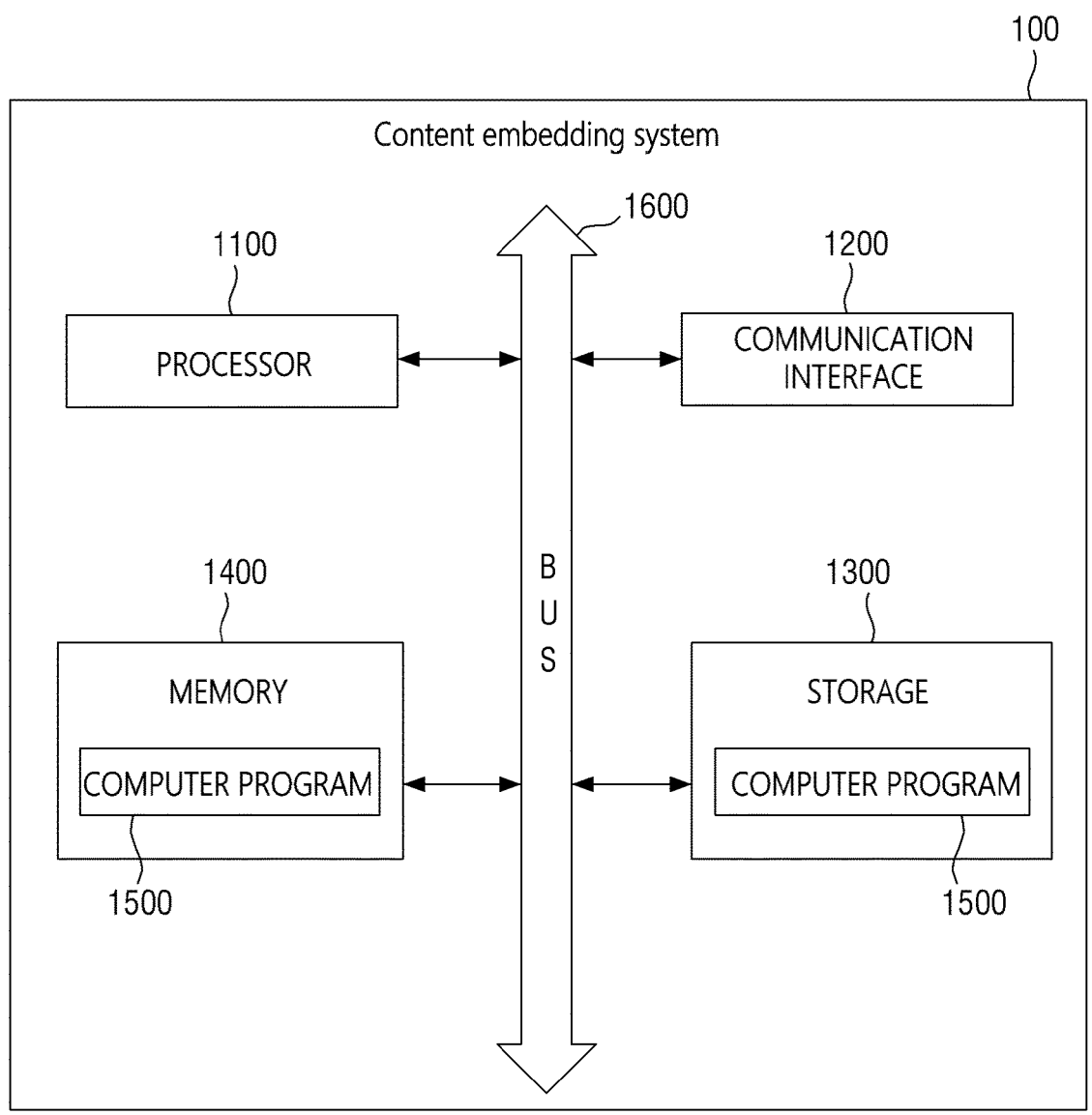
FIG. 12 is a block diagram illustrating the hardware configuration of a content embedding system according to some embodiments of the present disclosure.

FIG. 12 is a block diagram illustrating the hardware configuration of a content embedding system according to some embodiments of the present disclosure. FIG. 12 illustrates the hardware configuration of, for example, the content embedding system of FIG. 1. Referring to FIG. 12, a content embedding system 1000 may include at least one processor 1100, a system bus 1600, a communication interface 1200, a memory 1400, which loads therein a computer program 1500 to be executed by the processor 1100, and a storage 1300, which stores the computer program 1500.

The processor 1100 may control the general operation of each element of the content embedding system 1000. The processor 1100 may perform an operation for at least one application or program for executing methods according to some embodiments of the present disclosure.

The memory 1400 may load at least one computer program 1500 from the storage 1300 to execute the methods according to some embodiments of the present disclosure.

The storage 1300 may non-transitorily store the computer program 1500. The storage 1300 may include one or more instructions into which the methods according to some embodiments of the present disclosure are realized.

Once the computer program 1500 is loaded in the memory 1400, the processor 1100 may perform the methods according to some embodiments of the present disclosure by executing the instructions.

In some embodiments, the content embedding system 1000 may be configured using at least one physical server included in a server farm, based on cloud technology (e.g., virtual machines). In this case, at least some of the processor 1100, the memory 1400, and the storage 1300 of FIG. 12 may be virtual hardware, and the communication interface 1200 may be configured as a virtual networking element such as a virtual switch.

Embodiments of the present disclosure have been described above with reference to FIGS. 1 through 12, but the present disclosure is not limited thereto and may be implemented in various different forms. It will be understood that the present disclosure can be implemented in other specific forms without changing the technical spirit or gist of the present disclosure. Therefore, it should be understood that the embodiments set forth herein are illustrative in all respects and not limiting.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

What is claimed is:

1. A method of transmitting content, performed by a computing system, the method comprising:
    displaying, by a first terminal device, an embedding content search interface, which is included in a content authoring user interface for creating target content to be transmitted;
    displaying, by the first terminal device, an indicator of embedding content, determined by user input via the embedding content search interface, in an editing area in the content authoring user interface;
    transmitting, by the first terminal device, a body of the target content and metadata of the embedding content in response to receipt of input for a "Send" button in the content authoring user interface; and
    displaying, by a second terminal device, received content with the embedding content embedded therein,
    wherein the embedding content is embedded in the body of the target content by a server system, and
    wherein original data of the embedding content does not exist in the first terminal device, and the original data of the embedding content is transmitted from the server system to the second terminal device, without passing through the first terminal device, at a time after the body of the target content and the metadata of the embedding content are transmitted from the first terminal device.

2. The method of claim 1, wherein the displaying the embedding content search interface comprises displaying an "Attach" button in the editing area and displaying the embedding content search interface in response to the "Attach" button being selected.

3. The method of claim 2, wherein the displaying the "Attach" button comprises displaying the "Attach" button, only when no content is input to a line where a cursor of the editing area is located.

4. The method of claim 1, wherein the embedding content search interface includes a content category choice area and a checkbox for whether to display the indicator of the embedding content in the body of the target content.

5. The method of claim 4, wherein
    the content category choice area includes a plurality of content category choices to choose from,
    the indicator of the embedding content has a first appearance if the embedding content belongs to a first content category and has a second appearance if the embedding content belongs to a second content category, and
    the second content category is different from the first content category.

6. The method of claim 1, wherein the displaying the indicator of the embedding content in the editing area comprises receiving metadata of the embedding content from the server system and displaying the indicator with the received metadata applied thereto in the editing area.

7. The method of claim 6, further comprising:
    automatically moving a cursor of the editing area below the indicator of the embedding content, after the displaying the indicator of the embedding content in the editing area.

8. The method of claim 1, wherein the indicator of the embedding content is a graphic element that cannot be edited.

9. The method of claim 1, wherein the transmitting the body of the target content and the metadata of the embedding content comprises transmitting the body of the target content and only the metadata of the embedding content.

10. The method of claim 1, wherein the displaying the indicator of the embedding content in the editing area comprises downloading only the metadata of the embedding content.

11. A method of transmitting content, performed by a computing system, the method comprising:
    displaying, by a first terminal device, an embedding content search interface, which is included in a content authoring user interface for creating target content to be transmitted and is for receiving a selection for embedding content to be attached to the target content;
    transmitting, by the first terminal device, a body of the target content and metadata of the embedding content in response to receipt of input for a "Send" button in the content authoring user interface; and
    displaying, by a second terminal device, received content with the embedding content attached thereto,
    wherein the embedding content is attached by a server system to the target content, and
    wherein original data of the embedding content does not exist in the first terminal device, and the original data of the embedding content is transmitted from the server system to the second terminal device, without passing through the first terminal device, at a time after the body of the target content and the metadata of the embedding content are transmitted from the first terminal device.

12. The method of claim 11, further comprising:
    displaying, by the first terminal device, an indicator of the embedding content, determined in accordance with user input via the embedding content search interface, in an editing area, which is included in the content authoring user interface.

13. The method of claim 11, wherein the displaying the embedding content search interface comprises downloading only the metadata of the embedding content in response to the embedding content being selected via the embedding content search interface.

14. A method of transmitting content, performed by a computing system, the method comprising:
- displaying, by a first terminal device, an embedding content search interface, which is included in a content authoring user interface for creating target content to be transmitted;
- displaying, by the first terminal device, an attached file of attachment-containing content, determined by user input via the embedding content search interface, as an attachment candidate;
- storing information on the attachment candidate as information on an attachment of the target content in response to receipt of a selection for the attachment candidate from a user of the first terminal device; and
- displaying, by a second terminal device, received content with an attached file,
- wherein the attachment of the target content is attached by a server system to the target content, and
- wherein the attachment of the target content does not exist in the first terminal device.

* * * * *